US012777422B2

(12) United States Patent
Zhao et al.

(10) Patent No.: US 12,777,422 B2
(45) Date of Patent: Oct. 27, 2026

(54) WAKE-UP ALIGNMENT METHOD, SYSTEM, AND RELATED APPARATUS

(71) Applicant: Huawei Technologies Co., Ltd., Shenzhen (CN)

(72) Inventors: Fanfan Zhao, Shanghai (CN); Yuhua Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 18/699,747

(22) PCT Filed: Nov. 2, 2022

(86) PCT No.: PCT/CN2022/129213
§ 371 (c)(1),
(2) Date: Apr. 9, 2024

(87) PCT Pub. No.: WO2023/083068
PCT Pub. Date: May 19, 2023

(65) Prior Publication Data

US 2024/0414654 A1 Dec. 12, 2024

(30) Foreign Application Priority Data

Nov. 11, 2021 (CN) ........................ 202111335345.9

(51) Int. Cl.
*H04W 52/02* (2009.01)

(52) U.S. Cl.
CPC ... *H04W 52/0274* (2013.01); *H04W 52/0216* (2013.01); *H04W 52/0219* (2013.01)

(58) Field of Classification Search
CPC ......... H04W 52/0274; H04W 52/0216; H04W 52/0219
USPC .......................................................... 370/318
See application file for complete search history.

(56) References Cited

U.S. PATENT DOCUMENTS

| | | | | |
|---|---|---|---|---|
| 2014/0334365 | A1* | 11/2014 | Jafarian | H04W 52/0219 370/311 |
| 2017/0135043 | A1 | 5/2017 | Lin et al. | |
| 2021/0168711 | A1* | 6/2021 | Zhang | H04L 43/10 |
| 2022/0141753 | A1* | 5/2022 | McIlroy | H04L 1/0013 370/329 |
| 2023/0403648 | A1* | 12/2023 | Lee | H04W 52/0216 |

FOREIGN PATENT DOCUMENTS

| | | | |
|---|---|---|---|
| CN | 105807892 | A | 7/2016 |
| CN | 106937369 | A | 7/2017 |
| CN | 112019616 | A | 12/2020 |
| CN | 112584463 | A | 3/2021 |
| CN | 114995966 | A | 9/2022 |
| WO | 2015007246 | A1 | 1/2015 |

* cited by examiner

*Primary Examiner* — Faisal Choudhury
(74) *Attorney, Agent, or Firm* — Slater Matsil, LLP

(57) ABSTRACT

In accordance with an embodiment, a method includes: sending a first cycle to a central node device, wherein the first cycle is a wake-up cycle of the first subnode device; receiving a second cycle and a reference time point, wherein the second cycle is determined by the central node device based on the first cycle; and adjusting a first original wake-up time point of the first subnode device to a first wake-up time point based on the second cycle and the reference time point.

20 Claims, 8 Drawing Sheets

Communication system 10

WAKE-UP ALIGNMENT METHOD, SYSTEM, AND RELATED APPARATUS

CROSS-REFERENCE TO RELATED APPLICATIONS

This application is a national stage of International Application No. PCT/CN2022/129213, filed on Nov. 2, 2022, which claims priority to Chinese Patent Application No. 202111335345.9, filed on Nov. 11, 2021. Both of the aforementioned applications are hereby incorporated by reference in their entireties.

TECHNICAL FIELD

This application relates to the field of terminals and communication technologies, and in particular, to a wake-up alignment method, a system, and a related apparatus.

BACKGROUND

With development of the mobile Internet, an application service becomes more complex. Especially, in a general background of the internet of things, a plurality of electronic devices communicate with each other. Application service complexity poses a great challenge to power consumption overheads of the electronic device.

In a distributed network, for reasons such as service synchronization and data receiving/sending of electronic devices, there are frequent interrupt wake-ups of electronic devices. However, the frequent wake-ups of the electronic devices increase power consumption, and reduce a standby time of a system. This also means that the system is frequently activated, and a CPU is frequently in a high-speed running state, to increase the power consumption of the electronic devices. Therefore, how to control a wake-up of the electronic device to reduce system energy consumption overheads is an urgent problem to be resolved currently.

SUMMARY

This application provides a wake-up alignment method, a system, and a related apparatus. According to the wake-up alignment method, working paces of all electronic devices in a communication system can be unified, so that all the electronic devices can wake up at a unified wake-up time point, and endurance duration of the electronic device is shortened.

According to a first aspect, an embodiment of this application provides a wake-up alignment method. The method is applied to a first subnode device, and the method includes: The first subnode device sends a first cycle to a central node device. The first cycle is a wake-up cycle of the first subnode device. The first subnode device receives a second cycle and a reference time point. The second cycle is determined by the central node device based on the first cycle. The first subnode device adjusts a first original wake-up time point of the first subnode device to a first wake-up time point based on the second cycle and the reference time point. A difference between the first original wake-up time point and the first wake-up time point is not greater than a threshold, the first wake-up time point is a sum of the reference time point and N times of the second cycle, and N is an integer greater than or equal to 0.

According to the method in the first aspect, a subnode device may adjust a wake-up time point of the subnode device based on an optimal wake-up cycle sent by the central node device, namely, the second cycle, so that the subnode device can wake up at a unified wake-up time point. In addition, a difference between the adjusted wake-up time point and an original wake-up time point is small, so that an adjustment amplitude of the wake-up time point of the subnode device can be reduced as much as possible, and impact of an adjustment of the wake-up time point on work of the subnode device can be reduced.

With reference to the first aspect, the threshold is ½ of the second cycle.

Herein, that the threshold is ½ of the second cycle means that the first wake-up time point is a wake-up time point calculated based on a principle of proximity. Because First wake-up time point=Reference time point+Second cycle*N, when a value of N is different, the first wake-up time point is different. When the difference between the first wake-up time point and the first original wake-up time point is not greater than ½ of the second cycle, it indicates that the first wake-up time point is closest to the first original wake-up time point. In this way, a minimum adjustment amplitude of the wake-up time point can be ensured as far as possible, to avoid affecting an original service of the device.

With reference to the first aspect, that the first subnode device adjusts a wake-up time point of the first subnode device to a first wake-up time point specifically includes: The first subnode device communicates with a second subnode device and/or the central node device at the first wake-up time point.

In other words, a wake-up of the subnode device is specifically that the subnode device communicates with another device at the wake-up time point. The another device herein may be the central node device or another subnode device.

With reference to the first aspect, before the first subnode device communicates with the second subnode device at the first wake-up time point, the method further includes: The first subnode device powers on a CPU at the first wake-up time point.

Before the subnode device wakes up, the subnode device may be in a sleep state. When the subnode device needs to communicate with the another device, the subnode device needs to power on the CPU, so that the subnode device switches from the sleep state to a working state.

With reference to the first aspect, a wake-up of the first subnode device is a heartbeat wake-up or a non-real-time service wake-up.

Herein, the wake-up may include the heartbeat wake-up, the non-real-time service wake-up, and a real-time service wake-up. However, in the wake-up alignment method provided in this embodiment of this application, only a wake-up time point of the heartbeat wake-up and a wake-up time point of the non-real-time service wake-up are changed, because the real-time service wake-up is a wake-up triggered by an instant service. A wake-up time point of the instant service is not changed, to ensure that the instant service is executed normally in a timely manner.

With reference to the first aspect, the second cycle is a maximum value, a minimum value, an average value, or a common multiple of the first cycle and a wake-up cycle of the central node device.

With reference to the first aspect, after the first subnode device adjusts the wake-up time point of the first subnode device to the first wake-up time point based on the second cycle and the reference time point, the method further includes: The first subnode device receives a fourth cycle. The fourth cycle is determined by the central node device based on the first cycle and a third cycle of a third subnode device, and the third cycle is a wake-up cycle of the third subnode device. The first subnode device readjusts the wake-up time point of the first subnode device based on the fourth cycle.

In other words, when a subnode device is newly added to a communication system, an optimal wake-up cycle previously determined in the communication system may be changed again, to ensure that wake-up cycles of all electronic devices in the communication system to which the subnode device is newly added can be unified based on the changed optimal wake-up cycle. Then, the subnode device may readjust, based on the changed optimal wake-up cycle, a wake-up time point of a wake-up that is not triggered.

According to a second aspect, an embodiment of this application provides a wake-up alignment method. The method applied to a central node device, and the method includes: The central node device receives a first cycle of a first subnode device. The first cycle is a wake-up cycle of the first subnode device. The central node device determines a second cycle based on the first cycle. The central node device sends the second cycle and a reference time point to the first subnode device.

According to the method provided in the second aspect, to unify wake-up time points of all devices in a communication system that includes a plurality of devices, one central node device may receive wake-up cycles of one or more subnodes in the communication system, to determine a unified optimal wake-up cycle, namely, the second cycle based on the wake-up cycles, help all the devices in the communication system wake up based on the unified optimal wake-up cycle, reduce a quantity of wake-ups or a working time period of each device, and reduce power consumption of an electronic device.

With reference to the second aspect, a wake-up of the first subnode device is a heartbeat wake-up or a non-real-time service wake-up.

Herein, the wake-up may include the heartbeat wake-up, the non-real-time service wake-up, and a real-time service wake-up. However, in the wake-up alignment method provided in this embodiment of this application, only a wake-up time point of the heartbeat wake-up and a wake-up time point of the non-real-time service wake-up are changed, because the real-time service wake-up is a wake-up triggered by an instant service. A wake-up time point of the instant service is not changed, to ensure that the instant service is executed normally in a timely manner, so as to ensure that the electronic device normally runs.

With reference to the second aspect, the second cycle is a maximum value, a minimum value, an average value, or a common multiple of the first cycle and a wake-up cycle of the central node device.

With reference to the second aspect, the method further includes: The central node device receives a third cycle of a third subnode device. The third cycle is a wake-up cycle of the third subnode device. The central node device determines a fourth cycle based on the third cycle and the first cycle. The central node device sends the fourth cycle to the first subnode device and the third subnode device.

In other words, when a subnode device is newly added to a communication system, the central node device may obtain a wake-up cycle of the newly added subnode device, and change an optimal wake-up cycle again, to ensure that wake-up cycles of all electronic devices in the communication system to which the subnode device is newly added can be unified based on the changed optimal wake-up cycle.

With reference to the second aspect, before the central node device sends the second cycle and the reference time point of the central node device to the first subnode device, the method further includes: The central node device selects, as the reference time point from a wake-up time point of the central node device, a wake-up time point closest to a current time point.

In other words, the central node device may select, as the reference time point, a wake-up time point closest to the wake-up time point of the central node device, and send the selected wake-up time point to each subnode device, so that each subnode device can adjust a wake-up time point by using the reference time point as a reference of the adjusted wake-up time point, and the unified wake-up time point is as close to an original wake-up time point of the central node device as possible.

In some embodiments, the reference time point may alternatively be a power-on time point, a randomly generated time point, a preset time point, or the like of the central node device.

With reference to the second aspect, the central node device may adjust the original wake-up time point of the central node device based on the second cycle and the reference time point.

In other words, the central node device may alternatively adjust the original wake-up time point of the central node device based on the unified optimal wake-up cycle, so that the central node device and the subnode device may wake up at a unified wake-up time point.

According to a third aspect, an embodiment of this application provides a wake-up alignment method. The method is applied to a communication system including a first subnode device and a central node device, and the method includes: The first subnode device sends a first cycle to the central node device. The first cycle is a wake-up cycle of the first subnode device. The central node device receives the first cycle of the first subnode device. The central node device determines a second cycle based on the first cycle. The central node device sends the second cycle and a reference time point of the central node device to the first subnode device. The first subnode device adjusts a first original wake-up time point of the first subnode device to a first wake-up time point based on the second cycle and the reference time point. A difference between the first original wake-up time point and the first wake-up time point is not greater than a threshold, the first wake-up time point is a sum of the reference time point and N times of the second cycle, and N is an integer greater than or equal to 0.

According to the method in the third aspect, each device in the communication system can adjust a wake-up time point of the device based on a unified optimal wake-up cycle, to ensure that all the devices wake up at a unified wake-up time point. In addition, when each device adjusts the wake-up time point of the device based on the optimal wake-up cycle, it is ensured as much as possible that a difference between the adjusted wake-up time point and an original wake-up time point is small, an adjustment amplitude of the wake-up time point of each device is reduced as much as possible, and impact of adjustment of the wake-up time point on work of each device is reduced.

It should be noted that the communication system may include one central node device and one or more subnode devices. The first subnode device is a subnode device in the communication system. Both the central node device and the subnode device may adjust a wake-up time point based on the optimal wake-up cycle and the reference time point. In addition, adjusted wake-up intervals between cyclic wake-ups of all devices are not necessarily equal. For example, a wake-up interval of one device is 2T, and a wake-up interval of another device is 3T. Herein, T indicates an optimal wake-up cycle.

With reference to the third aspect, the threshold is ½ of the second cycle.

Herein, that the threshold is ½ of the second cycle means that the first wake-up time point is a wake-up time point calculated based on a principle of proximity. Because First wake-up time point=Reference time point+Second cycle*N, when a value of N is different, the first wake-up time point is different. When the difference between the first wake-up time point and the first original wake-up time point is not greater than ½ of the second cycle, it indicates that the first wake-up time point is closest to the first original wake-up time point. In this way, a minimum adjustment amplitude of the wake-up time point can be ensured as far as possible, to avoid affecting an original service of the device.

With reference to the third aspect, that the first subnode device adjusts a first original wake-up time point of the first subnode device to a first wake-up time point specifically includes: The first subnode device communicates with a second subnode device and/or the central node device at the first wake-up time point.

In other words, a wake-up of the subnode device is specifically that the subnode device communicates with another device at the wake-up time point. The another device herein may be the central node device or another subnode device.

With reference to the third aspect, before the first subdevice communicates with a second subdevice at the first wake-up time point, the method further includes: The first subdevice powers on a CPU at the first wake-up time point.

Before the subnode device wakes up, the subnode device may be in a sleep state. When the subnode device needs to communicate with the another device, the subnode device needs to power on the CPU, so that the subnode device switches from the sleep state to a working state.

With reference to the third aspect, a wake-up of the first subnode device is a heartbeat wake-up or a non-real-time service wake-up.

Herein, the wake-up may include the heartbeat wake-up, the non-real-time service wake-up, and a real-time service wake-up. However, in the wake-up alignment method provided in this embodiment of this application, only a wake-up time point of the heartbeat wake-up and a wake-up time point of the non-real-time service wake-up are changed, because the real-time service wake-up is a wake-up triggered by an instant service. A wake-up time point of the instant service is not changed, to ensure that the instant service is executed normally in a timely manner.

With reference to the third aspect, the second cycle is a maximum value, a minimum value, an average value, or a common multiple of the first cycle and a wake-up cycle of the central node device.

With reference to the third aspect, the communication system further includes a third subnode device; and after the first subnode device adjusts the wake-up time point of the first subnode device to the first wake-up time point based on the second cycle and the reference time point, the method further includes: The central node device receives a third cycle of the third subnode device. The third cycle is a wake-up cycle of the third subnode device. The central node device determines a fourth cycle based on the third cycle and the first cycle. The central node device sends the fourth cycle to the first subnode device and the third subnode device. The first subnode device readjusts the wake-up time point of the first subnode device based on the fourth cycle, and the third subnode device readjusts a wake-up time point of the third subnode device based on the fourth cycle.

In other words, when a subnode device is newly added to a communication system, an optimal wake-up cycle previously determined in the communication system may be changed again, to ensure that wake-up cycles of all electronic devices in the communication system to which the subnode device is newly added can be unified based on the changed optimal wake-up cycle. Each subnode device may readjust, based on the changed optimal wake-up cycle, a wake-up time point of a wake-up that is not triggered, to ensure that a wake-up pace of each device is calculated based on original wake-up paces of all devices.

Before the central node device sends the second cycle and the reference time point of the central node device to the first subnode device, the method further includes: The central node device selects, as the reference time point from a wake-up time point of the central node device, a wake-up time point closest to a current time point.

In other words, the central node device may select, as the reference time point, a wake-up time point closest to the wake-up time point of the central node device, and send the selected wake-up time point to each subnode device, so that each subnode device can adjust a wake-up time point by using the reference time point as a reference of the adjusted wake-up time point, and the unified wake-up time point is as close to an original wake-up time point of the central node device as possible.

In some embodiments, the reference time point may alternatively be a power-on time point, a randomly generated time point, a preset time point, or the like of the central node device.

With reference to the second aspect, the central node device may adjust the original wake-up time point of the central node device based on the second cycle and the reference time point.

In other words, the central node device may alternatively adjust the original wake-up time point of the central node device based on the unified optimal wake-up cycle, so that the central node device and the subnode device may wake up at a unified wake-up time point.

According to a fourth aspect, an embodiment of this application provides an electronic device, including a memory, one or more processors, and one or more programs. When the one or more processors execute the one or more programs, the electronic device is enabled to implement the method in any one of the first aspect or the implementations of the first aspect or any one of the second aspect or the implementations of the second aspect.

According to a fifth aspect, an embodiment of this application provides a computer-readable storage medium, including instructions. When the instructions are run on an electronic device, the electronic device is enabled to perform the method in any one of the first aspect or the implementations of the first aspect or any one of the second aspect or the implementations of the second aspect.

According to a sixth aspect, an embodiment of this application provides a computer program product. When the computer program product runs on a computer, the computer is enabled to perform the method in any one of the first aspect or the implementations of the first aspect or any one of the second aspect or the implementations of the second aspect.

According to the technical solutions provided in embodiments of this application, working paces of all electronic devices in a communication system can be unified, and a triggering time point of a wake-up of each device is changed, to reduce frequent wake-ups of the devices, optimize power consumption overheads of each device in the communication system, and ensure endurance duration of each device in the communication system.

DETAILED DESCRIPTION OF THE EMBODIMENTS

The following clearly describes the technical solutions in embodiments of this application in detail with reference to the accompanying drawings. In descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" and "second" may explicitly or implicitly include one or more features. In the descriptions of embodiments of this application, unless otherwise specified, "a plurality of" means two or more.

Figure 1:
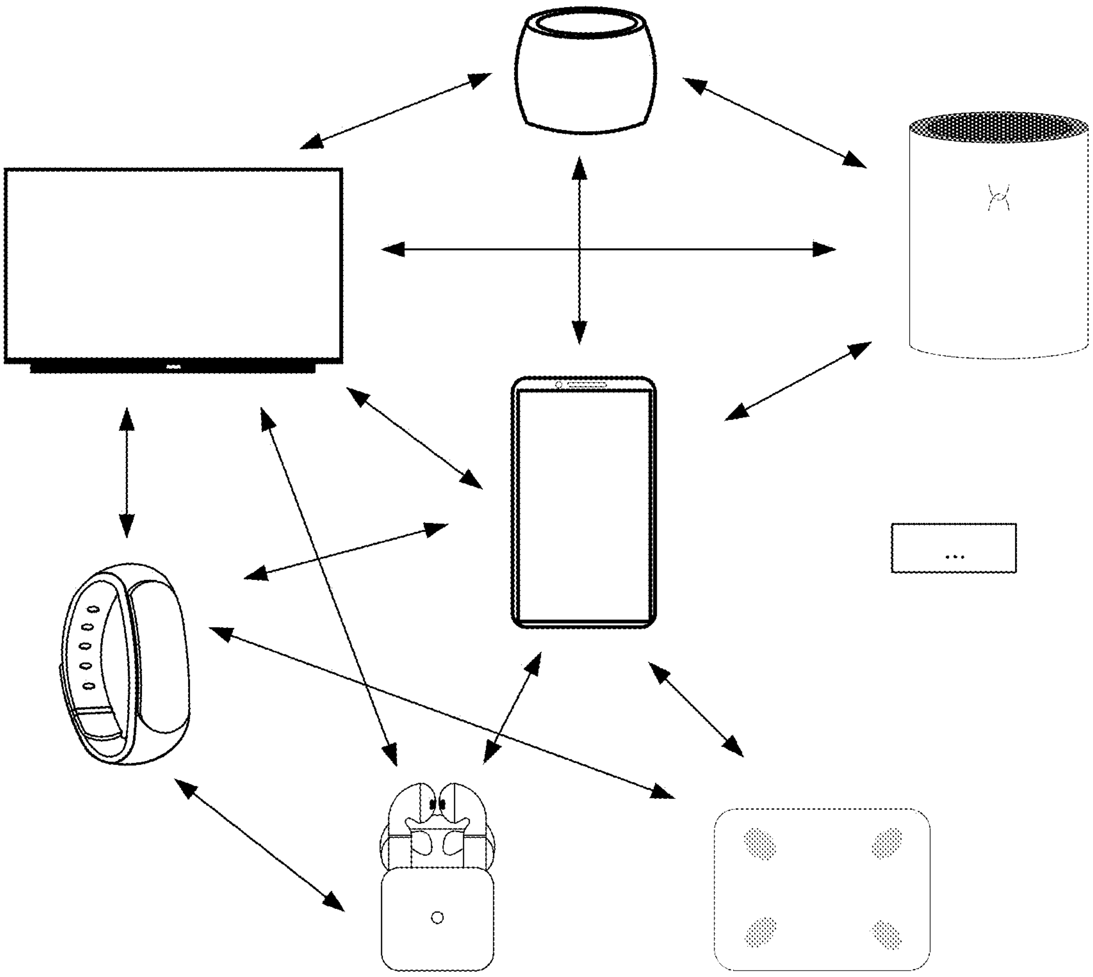
FIG. 1 is a schematic diagram of a structure of a communication system 10 according to an embodiment of this application.

FIG. 1 is a schematic diagram of a structure of a communication system 10 according to an embodiment of this application.

As shown in FIG. 1, the communication system 10 may be a communication system including a distributed network. The communication system 10 includes a plurality of electronic devices. The electronic device may be a mobile phone, a watch, a large screen, a headset, a sound box, an air purifier, a wristband, a toothbrush, a body fat scale, or the like. In the communication system, a communication connection may be established between the plurality of electronic devices, to perform data receiving/sending, service synchronization, or the like. For example, FIG. 1 shows an example that the mobile phone may establish a communication connection to a device such as a ring, a headset, a large screen, a sound box, or an air purifier. The communication connection may be a wired connection or a wireless connection.

Specifically, the wireless connection may be a short-range connection such as a high-fidelity wireless communication (Wi-Fi) connection, a Bluetooth connection, an infrared connection, an NFC connection, or a ZigBee connection. A communication process between the mobile phone and the body fat scale is used as an example. The body fat scale may send, to the mobile phone through a short-range connection, data collected by the body fat scale (for example, a weight, a body fat percentage, and a muscle mass percentage). Then, the mobile phone may analyze a physical condition of a user based on the data. In addition, the wireless connection may also be a remote connection, and the remote connection includes but is not limited to a mobile network that supports 2G, 3G, 4G, 5G, and a subsequent standard protocol. For example, a plurality of electronic devices may log in to a same user account (for example, a Huawei account), and then perform a remote connection by using a server.

In the communication system 10, to reduce power consumption of the electronic device, when the electronic device does not have a working process such as data receiving/sending and service synchronization, the electronic device usually enters a sleep state. When the electronic device needs to communicate with another electronic device in the communication system 10, the electronic device wakes up. In this case, because the plurality of electronic devices communicate in the communication system 10, and working paces of the electronic devices are different, the electronic device may frequently wake up. Consequently, a central processing unit (central processing unit, CPU) of the electronic device frequently enters a high-speed running state, or the electronic device is in a working state for a long period of time, to increase power consumption of the electronic device.

It should be noted that a type of the electronic device in the communication system 10 is not limited to the foregoing mentioned ecological devices such as a mobile phone, a watch, a large screen, a headset, a sound box, an air purifier, a wristband, a toothbrush, and a body fat scale. The type of the electronic device in the communication system 10 is not limited in this embodiment of this application.

To reduce power consumption of the electronic device, one solution is to use a wake-up alignment mechanism.

The wake-up alignment mechanism is equivalent to setting a timer in a process. When a time point is a time point specified by a timer, a process wake-up signal is sent to the process. In this way, a wake-up time point of the electronic device can be controlled, to prevent the electronic device from frequently waking up, and reduce power consumption of the electronic device. However, the wake-up alignment mechanism is only applicable to a wake-up of a single device, and cannot cover a wake-up caused by communication with another electronic device in the communication system 10. In other words, the wake-up alignment mechanism cannot unify working paces of all electronic devices in the communication system 10.

Therefore, how to simultaneously wake up all the electronic devices in the communication system 10 is an urgent problem to be resolved currently.

An embodiment of this application provides a wake-up alignment method. The method relates to a central node device and a subnode device. In the method, the central node device obtains a wake-up cycle of the subnode device, and calculates an optimal wake-up cycle based on the wake-up cycle. Then, the central node device sends the optimal wake-up cycle and a reference time point to the subnode device. The subnode device and the central node device determine an optimal wake-up time point based on the optimal wake-up cycle and the reference time point, and adjust a wake-up time point, so that all electronic devices in a communication system can wake up at a unified wake-up time point, to prevent the electronic devices from frequently waking up because working paces are not unified, shorten endurance duration of the electronic device, and reduce energy consumption of a communication system.

Both the central node device and the subnode device are electronic devices in the communication system 10 shown in FIG. 1. There is one central node device and one or more subnode devices. In other words, the central node device may collect a wake-up cycle of one or more subnode devices, and calculate, based on the one or more wake-up cycles, an optimal wake-up cycle that is applicable to a plurality of subnode devices and the central node device.

In addition, after the electronic device in the communication system 10 obtains the optimal wake-up cycle and the reference time point, the electronic device may determine the optimal wake-up time point based on the optimal wake-up time point and the reference time point, and adjust an original wake-up time point based on a principle of proximity for alignment, so that the electronic device can wake up at a specified unified time. Specifically, for determining of the optimal wake-up time point and an adjustment of the wake-up time point, refer to subsequent content. Details are not described herein again.

A wake-up manner of the electronic device includes but is not limited to the following two manners:

(1) Service Wake-Up

The service wake-up is a wake-up triggered by a service. The service wake-up may be an active wake-up performed by the electronic device when the electronic device has a service that needs to be executed, or may be a passive wake-up triggered by another electronic device when the electronic device has a cross-device service. For example, the service wake-up may be a wake-up that is of another electronic device and that is triggered when one electronic device needs to send a data synchronization message to the another electronic device.

The service wake-up includes a non-real-time service wake-up and a real-time service wake-up. The non-real-time service wake-up is a wake-up triggered by a non-instant service. For example, the non-instant service may be updating data. In other words, for the non-real-time service wake-up, the electronic device may change a wake-up time point of the non-real-time service. For example, the electronic device may delay the non-real-time service wake-up for a period of time. The real-time service wake-up is a wake-up triggered by an instant service. For example, the instant service may be a voice call service established between two devices. In other words, for the real-time service wake-up, the electronic device cannot change a wake-up time point of the real-time service, and the electronic device needs to wake up at the specified wake-up time point of the real-time service.

(2) Heartbeat Wake-Up

The heartbeat wake-up is a cyclic wake-up triggered to maintain communication between devices. To be specific, the heartbeat wake-up has a wake-up cycle, and the electronic device performs a cyclic heartbeat wake-up based on the wake-up cycle.

In this embodiment of this application, after receiving the optimal wake-up cycle, the electronic device performs a cyclic heartbeat wake-up based on the optimal wake-up cycle, changes a wake-up time point of the non-real-time service wake-up to a wake-up time point of a latest heartbeat wake-up existing when the electronic device performs a cyclic heartbeat wake-up, and does not change a wake-up time point of the real-time service wake-up. In this way, a quantity of wake-ups of the electronic device may be reduced as much as possible while it is ensured that the instant service and the non-instant service are normally executed.

Figure 2:
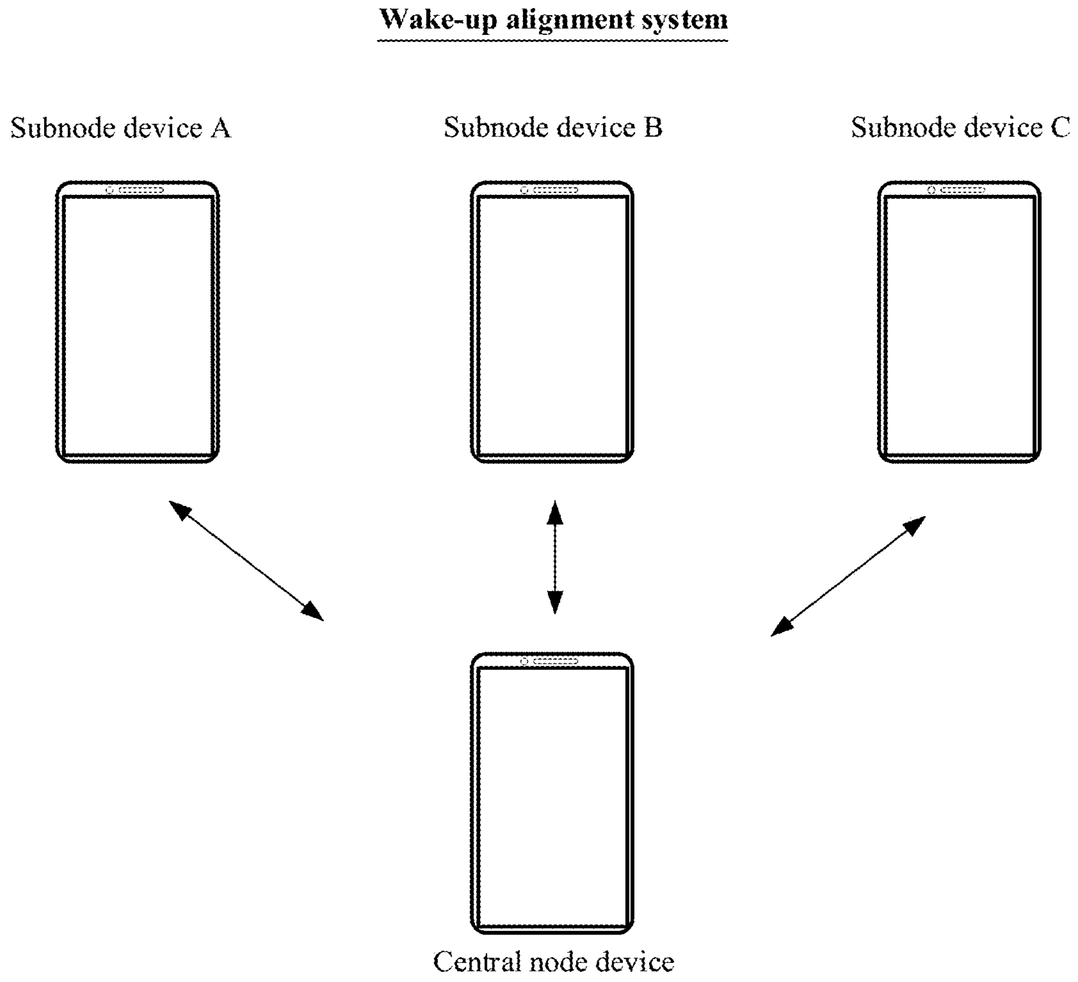
FIG. 2 is a schematic diagram of a structure of a wake-up alignment system according to an embodiment of this application.

FIG. 2 is an example schematic diagram of a structure of a wake-up alignment system according to an embodiment of this application.

As shown in FIG. 2, the wake-up alignment system may include some or all electronic devices in a communication system 10. Specifically, the wake-up alignment system includes a central node device and a subnode device. There is one central node device and one or more subnode devices. Subnode devices shown in FIG. 2 include three electronic devices: a subnode device A, a subnode device B, and a subnode device C.

In the wake-up alignment system shown in FIG. 2, the central node device is configured to: receive wake-up cycles of the subnode devices A to C, and calculate, based on the wake-up cycles of the three subnode devices, an optimal wake-up cycle that is applicable to the central node device and the subnode devices A to C. Then, the central node device sends the optimal wake-up cycle and a reference time point to the subnode devices A to C. The subnode devices A to C are configured to: send respective wake-up cycles to the central node device, and receive the optimal wake-up time point and the reference time point that are sent by the central node device. In addition, the central node device and the subnode devices A to C all may calculate the optimal wake-up time point based on the optimal wake-up time point and the reference time point, and adjust an original wake-up time point in each electronic device. Specifically, the central node device and the subnode devices A to C may adjust a wake-up time point of a heartbeat wake-up and a wake-up time point of a non-real-time service wake-up based on a principle of proximity for alignment, and do not adjust an original wake-up time point of implementing a service wake-up.

It should be noted that the central node device may be any device in the communication system 10, the subnode device may be any one or more devices other than the central node device in the communication system 10, and a quantity of subnode devices is not limited to three in the wake-up alignment system shown in FIG. 2. There is a cross-device service wake-up between electronic devices in the wake-up alignment system, or there is a heartbeat wake-up existing to maintain communication between devices. The central node device may be selected based on performance of a device. For example, the central node device may be a device with best performance in the wake-up alignment system, or the central node device may be selected based on a service of the device. For example, the central node device may be a device with a smallest quantity of services in the wake-up alignment system. A remaining device other than the determined central node device in the wake-up alignment system is a subnode device. It may be understood that selection of the central node device is not limited in this embodiment of this application.

Figure 3:
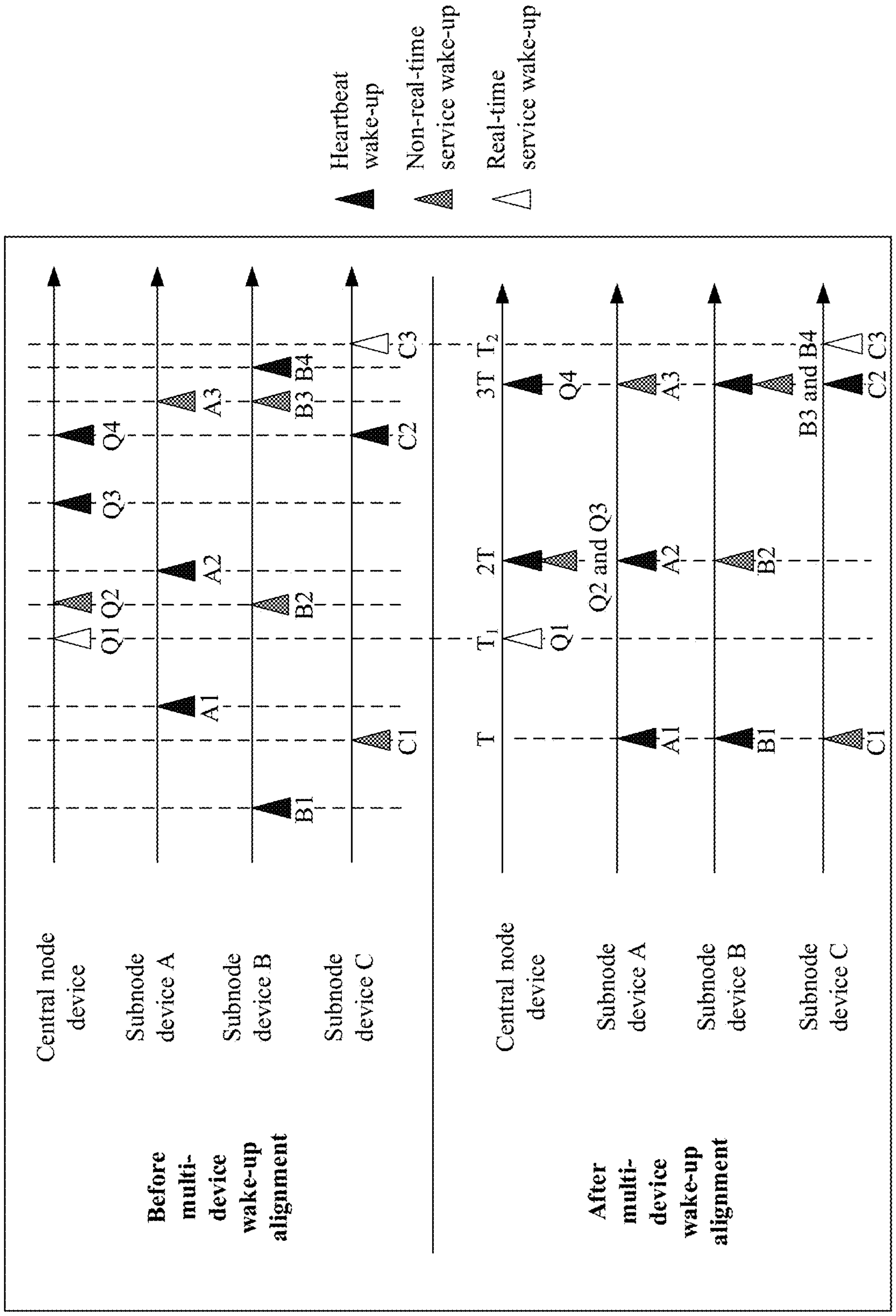
FIG. 3 is a diagram of a wake-up sequence of all electronic devices in a wake-up alignment system according to an embodiment of this application.

FIG. 3 shows an example of a wake-up sequence of all electronic devices in a wake-up alignment system.

Before multi-device wake-up alignment, to be specific, when all the electronic devices wake up based on respective service paces, all the electronic devices may frequently wake up. As shown in FIG. 3, before multi-device wake-up alignment, a central node device has four wake-ups Q1 to Q4, Q1 is a real-time service wake-up, Q2 is a non-real-time service wake-up, and Q3 and Q4 are heartbeat wake-ups. A subnode device A has three wake-ups A1 to A3, A1 and A2 are heartbeat wake-ups, and A3 is a non-real-time service wake-up. A subnode device B has four wake-ups B1 to B4, B1 and B4 are heartbeat wake-ups, and B2 and B3 are non-real-time service wake-ups. A subnode device C has three wake-ups C1 to C3, C1 is a non-real-time service wake-up, C2 is a heartbeat wake-up, and C3 is a real-time service wake-up. The non-real-time service wake-up Q2 of the central node device and the non-real-time service wake-up B2 of the subnode device B are simultaneous wake-ups that are of the two devices and that are caused by a same cross-device service, and the non-real-time service wake-up A3 of the subnode device A and the non-real-time service wake-up B3 of the subnode device B are simultaneous wake-ups that are of the two devices and that are caused by a same cross-device service.

It can be learned that when one electronic device wakes up, another electronic device in the communication system 10 may wake up simultaneously or be in a working state. For example, the non-real-time service wake-up Q2 of the central node device and the non-real-time service wake-up B2 of the subnode device B are simultaneous wake-ups that are of the two devices and that are caused by a same service. In addition, all the electronic devices have different wake-up paces, the central node device or the subnode device may frequently wake up or be in a working state for a long period of time. For example, after the central node device has the real-time service wake-up Q1 at a first moment, the central node device returns to a sleep state after completing processing of a real-time service, but triggers the non-real-time service wake-up Q2 at a second moment because of a cross-device service process between the central node device and the subnode device B. Therefore, power consumption of the central node device is large.

To unify wake-up paces of all the devices in the wake-up alignment system, the central node device may send an optimal wake-up cycle and a reference time point to the subnode devices A to C, so that the subnode devices A to C calculate a cyclic optimal wake-up time point, and change original wake-up time points of all the devices in the wake-up alignment system based on a principle of proximity for alignment, so that all the devices wake up at a unified time point.

After multi-device wake-up alignment, the central node device and the subnode devices A to C perform a heartbeat wake-up and a non-real-time service wake-up based on a unified wake-up time point, without changing a wake-up time point of a real-time service wake-up. As shown in FIG. 3, after multi-device wake-up alignment, the central node device performs the real-time service wake-up Q1 at an original time point $T_1$; performs one wake-up at a time point 2T, where the wake-up includes the non-real-time service wake-up Q2 and the heartbeat wake-up Q3; and performs the heartbeat wake-up Q4 at a time point 3T. The subnode device A performs the heartbeat wake-up A1 at a time point T; performs the heartbeat wake-up A2 at the time point 2T; and performs the non-real-time service wake-up A3 at the time point 3T. The subnode device B performs the heartbeat wake-up B1 at the time point T; performs the non-real-time service wake-up B2 at the time point 2T; and performs one wake-up at the time point 3T, where the wake-up includes the heartbeat wake-up B3 and the non-real-time service wake-up B4. The subnode device C performs the non-real-time service wake-up C1 at the time point T; performs the heartbeat wake-up C2 at the time point 3T; and performs the real-time service wake-up at an original time point $T_2$.

It can be learned that the central node device and the subnode device may wake up at a unified cyclic time point. For example, the central node device originally needs to trigger the non-real-time service wake-up Q2 and the heartbeat wake-up Q3 at two different time points. After multi-device wake-up alignment, the central node device may perform only one wake-up, to complete a heartbeat wake-up for keeping a connection to another device and a non-real-time service wake-up required for communication of the non-real-time service with the subnode device B. In this way, a quantity of wake-ups or a working time period of the electronic device can be reduced, and power consumption of the electronic device can be reduced.

In addition, it should be noted that, after multi-device wake-up alignment, adjusted wake-up cycles of the electronic devices are not necessarily the same, and are not necessarily equal to a unified optimal wake-up cycle. Specifically, the adjusted wake-up cycles of the electronic devices may be M times of the optimal wake-up cycle. Herein, M is a positive integer. For example, it is assumed that the optimal wake-up cycle is 5 minutes, there are two subnode devices: the device A and the device B, the device A may adjust a wake-up cycle of the heartbeat wake-up to 10 minutes, and the device B may adjust a wake-up cycle of the heartbeat wake-up to 15 minutes.

Figure 4:
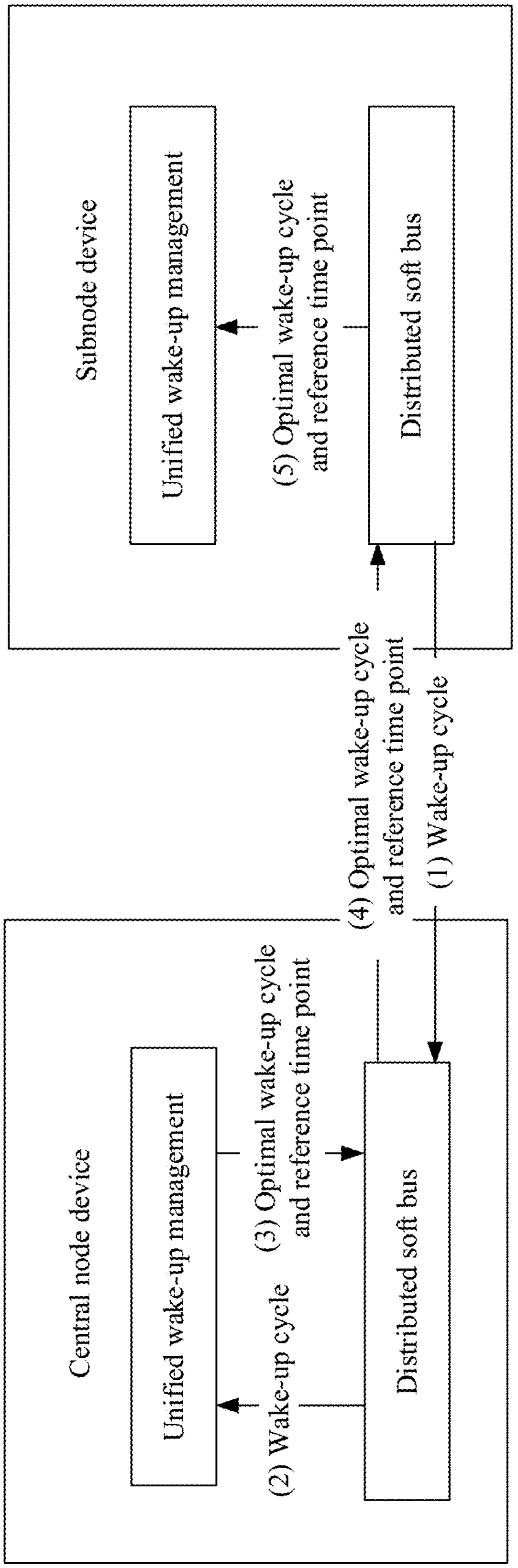
FIG. 4 is a schematic diagram of a software structure of a wake-up alignment system according to an embodiment of this application.

FIG. 4 is a schematic diagram of a software structure of a wake-up alignment system.

As shown in FIG. 4, the wake-up alignment system includes a central node device and a subnode device. The central node device and the subnode device each include a unified wake-up management module and a distributed soft bus. It should be noted that FIG. 4 shows only an interaction process between one subnode device and the central node device. The wake-up alignment system may include a plurality of subnode devices, and an interaction process between another subnode device and the central node device is consistent with the interaction process shown in FIG. 4.

In the central node device, the distributed soft bus is configured to: receive a wake-up cycle sent by another device, and send an optimal wake-up cycle and a reference time point to the another device. A unified wake-up module is configured to: obtain a reference time point of the central node device, calculate the optimal wake-up cycle based on the wake-up cycle of the another device and a wake-up cycle of the central node device, and determine an aligned optimal wake-up time point based on the optimal wake-up cycle and the reference time point, so that the central node device wakes up based on the aligned optimal wake-up time point.

In the subnode device, the distributed soft bus is configured to: send a wake-up cycle to the central node device, and receive the optimal wake-up cycle and the reference time point that are sent by the central node device. The unified wake-up module is configured to determine an aligned optimal wake-up time point based on the optimal wake-up cycle and the reference time point, so that the subnode device wakes up based on the aligned optimal wake-up time point.

As shown in FIG. 4, in a specific implementation, the wake-up alignment system mainly aligns wake-up time points in the following six steps:

(1) The subnode device sends a wake-up cycle to the central node device through the distributed soft bus.

The wake-up cycle is a wake-up cycle used by the subnode device before wake-up alignment, and each subnode device may perform a cyclic heartbeat wake-up based on the wake-up cycle.

When the subnode device includes a plurality of devices, the central node device may obtain wake-up cycles of the plurality of devices. The plurality of devices may be all subnode devices other than the central node device in a communication network, or the plurality of devices may be some subnode devices other than the central node device in a communication system 10. The some subnode devices may be devices that currently need to communicate with another device in the communication system 10, or are devices in a working state.

(2) The central node device sends the wake-up cycle to the unified wake-up management module through the distributed soft bus.

Specifically, the central node device may send a wake-up cycle of one or more subnode devices to the unified wake-up management module in the central node device through the distributed soft bus.

(3) The central node device obtains the optimal wake-up cycle and the reference time point by using the unified wake-up management module, and sends the optimal wake-up cycle and the reference time point to the distributed soft bus.

The unified wake-up management module in the central node device may calculate an optimal wake-up cycle based on one or more received wake-up cycles and the wake-up cycle of the central node device. The optimal wake-up cycle may be an average value, a common multiple, a minimum value, a maximum value, or the like of the wake-up cycle of the central node device and the wake-up cycle of the subnode device. A relationship between the optimal wake-up cycle and the wake-up cycle is not limited in this embodiment of this application.

The reference time point is used to determine a start of a wake-up time point, so that a plurality of devices in the communication system 10 can wake up at a same time point. The reference time point may be a power-on time point, a randomly generated time point, a preset time point, or the like of the central node device. The reference time point is not limited in this embodiment of this application.

(4) The central node device sends the optimal wake-up cycle and the reference time point to the subnode device through the distributed soft bus.

Specifically, the central node device may send the optimal wake-up cycle and the reference time point to one or more subnode devices included in the communication system 10 through the distributed soft bus.

(5) The subnode device sends the optimal wake-up cycle and the reference time point to the unified wake-up management module through the distributed soft bus.

(6) The central node device and the subnode device calculate the optimal wake-up time point based on the optimal wake-up cycle and the reference time point, so that all devices wake up at the optimal wake-up time point.

The central node device and the subnode device may calculate the optimal wake-up time point based on the following formula:

$$X = N * T + \text{Delta} \qquad \text{Formula 1}$$

Herein, X is the optimal wake-up time point, N={0, 1, 2, 3, . . . }, T is the optimal wake-up cycle, and Delta is the reference time point.

It can be learned that when values of N are different, calculated optimal wake-up time points are different. The central node device or the subnode device may change an original wake-up time point (also referred to as an original wake-up time point) based on a principle of proximity for alignment, and collectively change the original wake-up time point to an optimal wake-up time point closest to the original wake-up time point.

In a specific implementation, for one wake-up, the central node device or the subnode device may adjust a time point of the wake-up based on the following formula:

$$Y = \begin{cases} X1 & Z - X1 \leq T/2 \\ X2 & Z - X1 > T/2 \\ Z & X1 = Z \end{cases} \qquad \text{Formula 2}$$

Herein, Y is an aligned optimal wake-up time point of the wake-up, X1 and X2 indicate two adjacent optimal wake-up time points, Z indicates an original wake-up time point, and a relationship between Z and each of X1 and X2 may be denoted as $(N_1{*}T+\text{Delta})=X1 \leq Z<((N_1+1){*}T+\text{Delta})=X2$, where $N1 \in N$.

It can be learned from Formula 2 that when an interval between the original wake-up time point Z and an optimal wake-up time point X1 of a previous cycle point is less than or equal to an interval between the original wake-up time point Z and an optimal wake-up time point X2 of a next cycle point, the original wake-up time point may be changed to the optimal wake-up time point X1 of the previous cycle point; when an interval between the original wake-up time point Z and an optimal wake-up time point X1 of a previous cycle point is greater than an interval between the original wake-up time point Z and an optimal wake-up time point X2 of a next cycle point, the original wake-up time point may be changed to the optimal wake-up time point X2 of the next cycle point; or when the original wake-up time point Z is exactly the optimal wake-up time point X1, the original wake-up time point is not changed. That is, the aligned wake-up time point of the wake-up may be determined based on the principle of proximity for alignment.

It should be noted that when the interval between the original wake-up time point Z and the optimal wake-up time point X1 of the previous cycle point is equal to the interval between the original wake-up time point Z and the optimal wake-up time point X2 of the next cycle point, the original wake-up time point may alternatively be changed to the optimal wake-up time point of the next cycle point. This is not limited in this embodiment of this application.

The following uses a specific example to explain a principle of adjusting the wake-up time point by the central node device or the subnode device.

Figure 5:
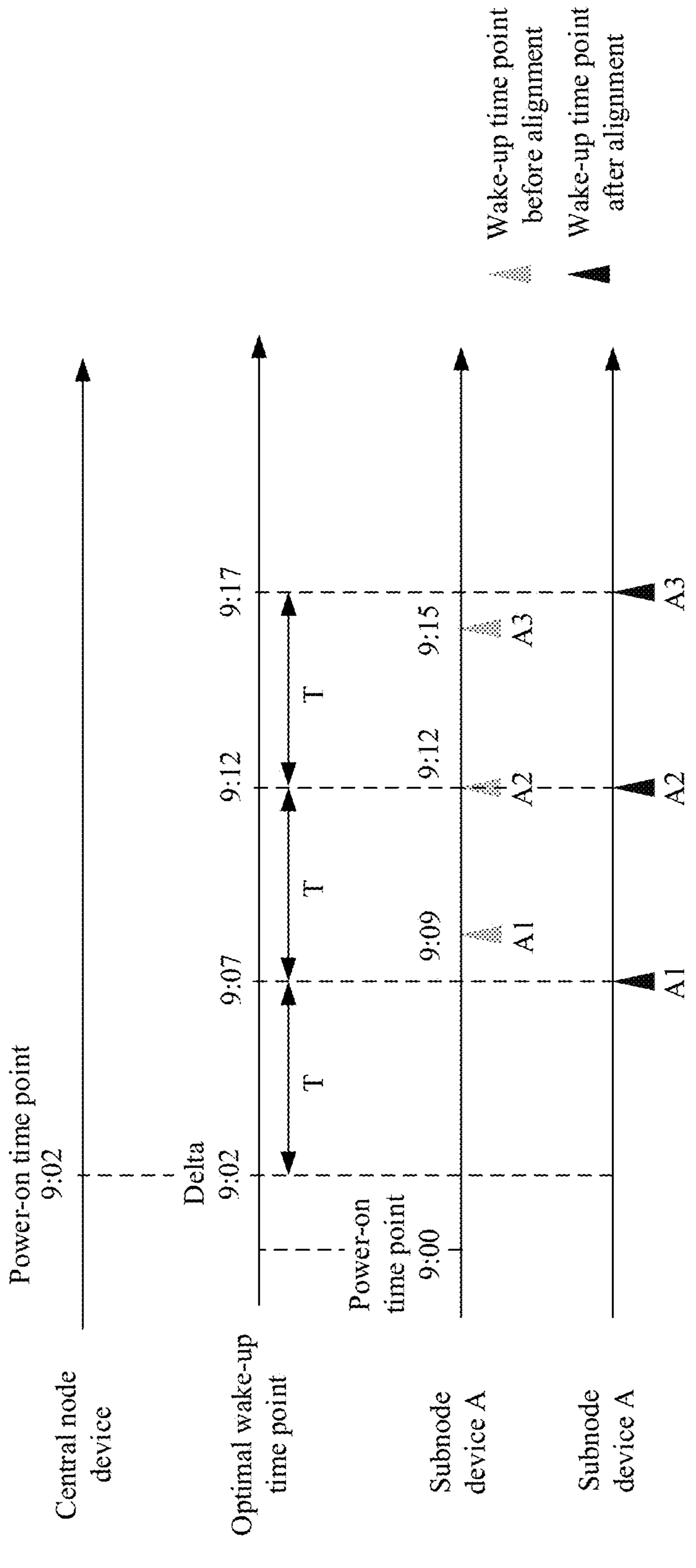
FIG. 5 is a diagram of a wake-up sequence of a subnode device and a central node device according to an embodiment of this application.

FIG. 5 is an example diagram of a wake-up sequence of a subnode device and a central node device.

As shown in FIG. 5, the central node device uses a power-on time point (09:02) of the central node device as a reference time point, uses 5 minutes as an optimal wake-up cycle, and sends the reference time point and the optimal wake-up cycle to the subnode device A. The subnode device A calculates a plurality of optimal wake-up time points (for example, 09:02, 09:07, 09:12, 09:17, . . . ) based on Formula 1, the reference time point, and the optimal wake-up cycle. The subnode device A originally has three wake-up time points A1, A2, and A3, which are respectively 09:09, 09:12, and 09:15. Because a previously closest optimal wake-up time point of 09:09 is 09:07, and it is calculated based on Formula 2 that 2≤2.5, the original wake-up time point A1 09:09 is adjusted to 09:07. Because 09:12 is equal to a previously closest optimal wake-up time point 09:12, the wake-up time point A2 is not changed. Because a previously closest optimal wake-up time point of 09:15 is 09:12, and it is calculated based on Formula 2 that 3>2.5, Y is 09:17. Therefore, the original wake-up time point 09:15 is adjusted to a next cycle point 09:17.

Figure 6:
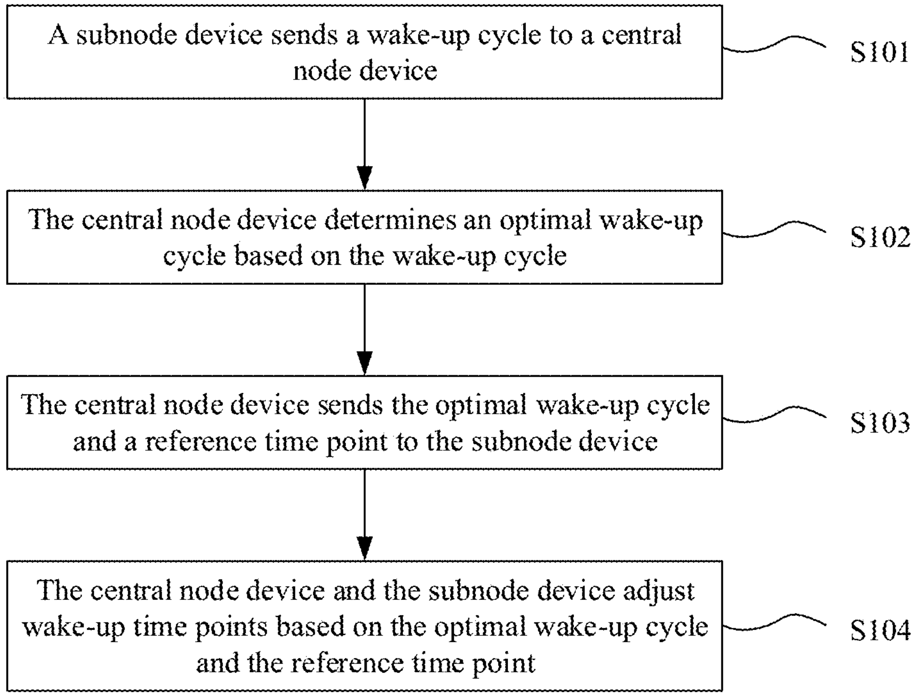
FIG. 6 is a schematic flowchart of a wake-up alignment method according to an embodiment of this application.

FIG. 6 is a schematic flowchart of a wake-up alignment method according to an embodiment of this application.

As shown in FIG. 6, the method includes the following steps.

S101: A subnode device sends a wake-up cycle to a central node device.

The central node device may be any device in a communication system 10, and the subnode device may be one or more devices other than the central node device in the communication system 10.

The central node device may establish a communication connection to the subnode device, or a communication connection may be established between subnode devices. The communication connection may be a wired connection or a wireless connection. For specific descriptions of the communication connection, refer to the foregoing content. Details are not described herein again.

The wake-up cycle sent by the subnode device may be a wake-up cycle that is of the subnode device and that exists when wake-up alignment is not currently performed. The subnode device may perform a cyclic heartbeat wake-up based on the wake-up cycle.

S102: The central node device determines an optimal wake-up cycle based on the wake-up cycle.

After receiving a wake-up cycle sent by one or more subnode devices, the central node device may determine the optimal wake-up cycle based on one or more wake-up cycles. The optimal wake-up cycle may be a common multiple, an average value, a maximum value, a minimum value, or the like of the one or more wake-up cycles and a wake-up cycle of the central node device. For example, the central node device learns that wake-up cycles of two subnode devices are 5 minutes and 8 minutes, the wake-up cycle of the central node device is 5 minutes, and the central node device may use an average value of the wake-up cycles as the optimal wake-up cycle. Therefore, the optimal wake-up cycle is 6 minutes.

For example, the wake-up cycle sent by the subnode device to the central node may alternatively be a first cycle. The optimal wake-up cycle determined by the central node device based on the first cycle may alternatively be a second cycle. The subnode device may be specifically a first subnode device. The first subnode device may be one or more devices in a communication system that perform wake-up alignment with the central node device.

S103: The central node device sends the optimal wake-up cycle and a reference time point to the subnode device.

The reference time point is used to determine a start of a wake-up time point, so that a plurality of devices in the communication system 10 can wake up at a same time point. The reference time point may be a power-on time point, a randomly generated time point, a preset time point, or the like of the central node device. The reference time point is not limited in this embodiment of this application.

S104: The central node device and the subnode device adjust wake-up time points based on the optimal wake-up cycle and the reference time point.

Herein, because an execution process of the central node device and an execution process of the subnode device are the same, an electronic device is used to collectively indicate the central node device and the subnode device below.

Specifically, the electronic device may calculate the optimal wake-up time point based on the optimal wake-up cycle and the reference time point, and then adjust an original wake-up time point in the electronic device based on a principle of proximity for alignment.

The electronic device may calculate the optimal wake-up time point based on Formula 1. The optimal wake-up time point may include a plurality of cyclically increasing values. The electronic device may adjust the original wake-up time point based on Formula 2. For example, the central node device is used as an example. It is assumed that the central node device originally has a heartbeat wake-up that is at 9:08, and calculates two optimal wake-up time points 9:05 and 9:10 based on the optimal wake-up cycle and the reference time point. Because 9:10 is closer to 9:08 than 9:05, the central node device may change a time point of the heartbeat wake-up to 9:10 based on the principle of proximity for alignment.

In addition, a wake-up manner includes a non-real-time service wake-up, a real-time service wake-up, and a heartbeat wake-up. When an original wake-up in the electronic device is a real-time service wake-up, the electronic device does not change an original wake-up time point of the real-time service wake-up; or when an original wake-up in the electronic device is a real-time service wake-up or a heartbeat wake-up, the electronic device may adjust an original wake-up time point of the wake-up based on the optimal wake-up cycle and the reference time point.

Specifically, in a process in which the subnode device adjusts the wake-up time point based on the optimal wake-up time point and the reference time point, the subnode device may adjust the original wake-up time point to a first wake-up time point. A difference between the original wake-up time point and the first wake-up time point is not greater than a threshold. First wake-up time point=Reference time point+Optimal wake-up cycle*N, where N≥0. For example, the threshold may be ½ of the optimal wake-up cycle. In addition, that the subnode device adjusts the original wake-up time point to the first wake-up time point is specifically that the subnode device powers on a CPU at the first wake-up time point, enters a working state, and communicates with another device. For example, the subnode device may be the first subnode device, and the another device may be a second subnode device and/or the central node device. The central node device, the first subnode device, and the second subnode device are all located in the communication system 10 shown in FIG. 2.

In addition, the subnode device or the central node device may have a plurality of original wake-up time points. For example, the original wake-up time point of the subnode device may include a first original wake-up time point, a second original wake-up time point, and the like. The subnode device may adjust the first original wake-up time point to the first wake-up time point based on the optimal wake-up time point and the reference time point, and adjusts the second original wake-up time point to a second wake-up time point.

In some embodiments, when the central node device has determined the optimal wake-up cycle based on the wake-up cycle, and one or more subnode devices are newly added to the communication system 10, the central node device may obtain a wake-up cycle of the one or more newly added subnode devices, redetermine the optimal wake-up cycle, and send the optimal wake-up cycle to all devices in the communication system 10. For example, the newly added subnode device in the communication system 10 may be a third subnode device. A wake-up cycle of the third subnode device may be a third cycle. After the central node device has determined the optimal wake-up cycle, the central node device may redetermine an optimal wake-up cycle (for example, a fourth cycle) based on the third cycle and a previously received wake-up cycle (for example, a second cycle) of the subnode device, and send the redetermined optimal wake-up cycle to each subnode device in the communication system 10. Each subnode device may adjust a wake-up time point based on a latest received optimal wake-up cycle.

It should be noted that when the central node device adjusts the wake-up time point based on the optimal wake-up cycle and the reference time point, the central node device may adjust the wake-up time point before sending the optimal wake-up cycle and the reference time point to the subnode device after determining the optimal wake-up cycle. In other words, for the central node device, S104 may be performed before S103.

In general, according to the wake-up alignment method provided in this embodiment of this application, a wake-up triggering time point can be changed, to reduce frequent wake-ups that are of devices and that are caused by the non-real-time service and keepalive, optimize power consumption overheads of the devices in the communication system 10, ensure endurance duration of the devices in the communication system 10, ensure normal execution of an instant service, and simultaneously satisfy normal running of the device while all the devices simultaneously wake up.

Figure 7:
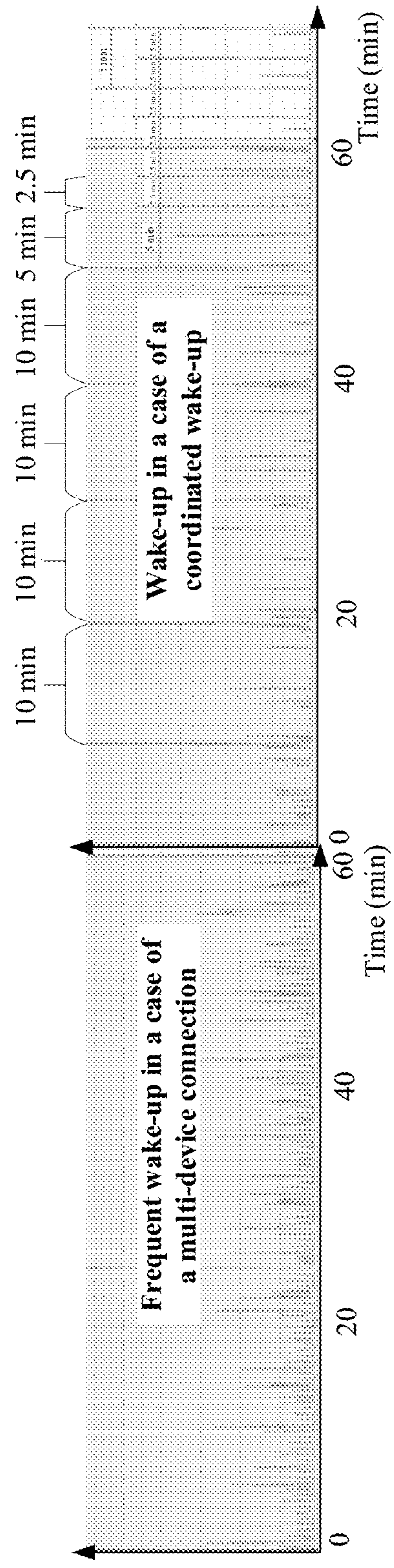
FIG. 7 is a schematic diagram of a power consumption waveform before multi-device wake-up alignment and a power consumption waveform after wake-up alignment according to an embodiment of this application.

FIG. 7 is an example schematic diagram of a power consumption waveform before multi-device wake-up alignment and a power consumption waveform after wake-up alignment. It can be learned from a left waveform diagram in FIG. 7 that there are dense waveform peaks in the diagram. To be specific, before multi-device wake-up alignment, the electronic device has frequent wake-ups and a large power loss. It can be learned from a right waveform diagram in FIG. 7 that waveform peaks occur at intervals. For example, the waveform peaks occur at an interval of 10 minutes, the waveform peaks occur at an interval of 5 minutes, or the waveform peaks occur at an interval of 2.5 minutes. That is, after multi-device wake-up alignment, a quantity of wake-ups of the electronic device is reduced, and a multiple of a value of a wake-up cycle is used as time of an interval between wake-ups, to reduce a power loss of the electronic device.

Figure 8:
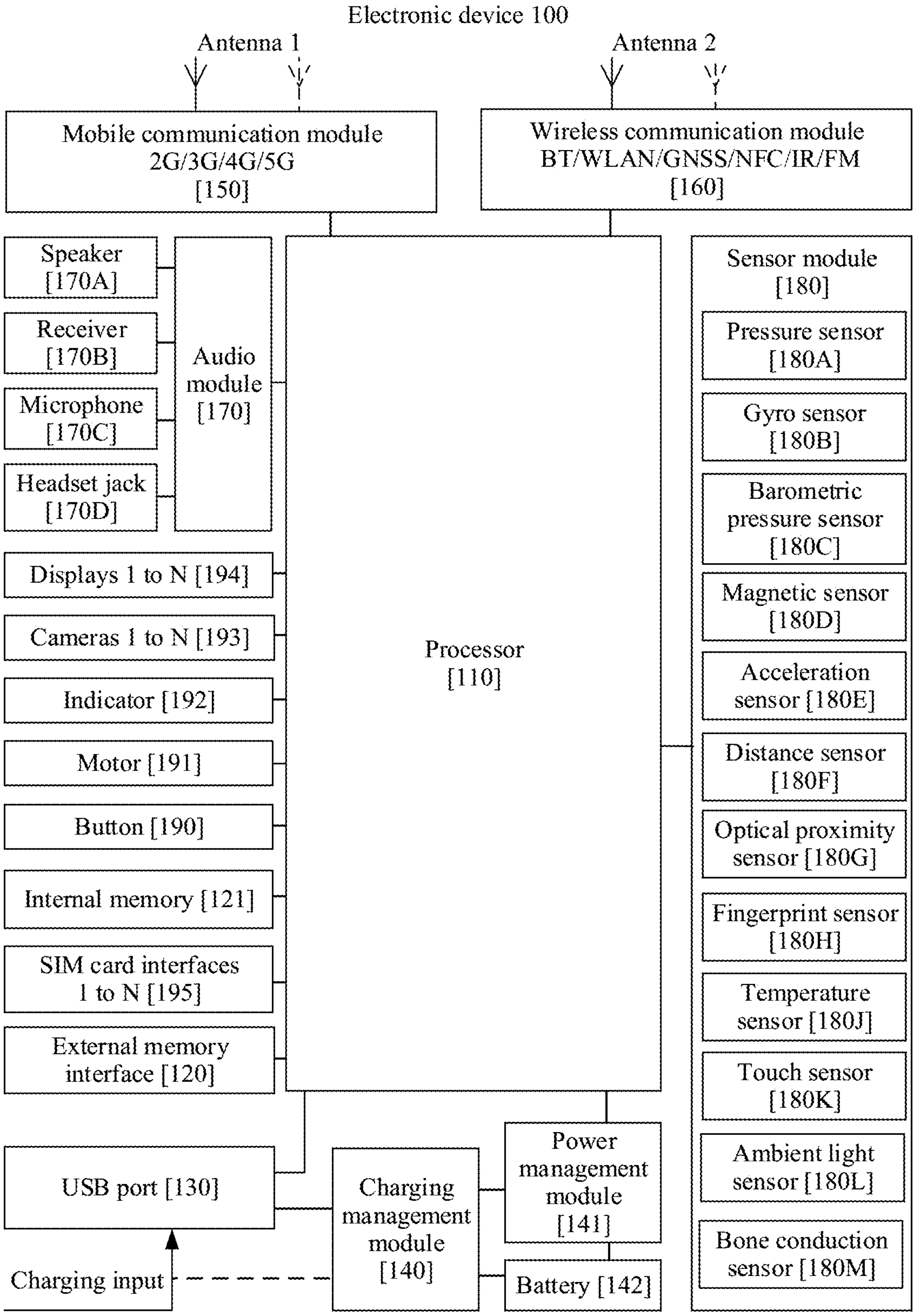
FIG. 8 is a schematic diagram of a hardware structure of an electronic device 100 according to an embodiment of this application.

FIG. 8 is a schematic diagram of a hardware structure of an electronic device 100 according to an embodiment of this application.

As shown in FIG. 8, the electronic device 100 may be a mobile phone, a wristband, a headset, a large screen, a body fat scale, an air purifier, a smart sound box, a tablet, a desktop computer, a laptop computer, a handheld computer, a notebook computer, an ultra-mobile personal computer (ultra-mobile personal computer, UMPC), a netbook, and a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specifically limited in this embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that is just used or repeatedly used by the processor 110. If the processor 110 needs to use the instructions or the data again, the processor may directly invoke the instructions or the data from the memory. This avoids repeated access, reduces waiting time of the processor 110, and improves system efficiency. In some embodiments, the processor 110 may include one or more interfaces.

The charging management module 140 is configured to receive a charging input from a charger. The power management module 141 is configured to be connected to the battery 142, the charging management module 140, and the processor 110.

A wireless communication function of the electronic device 100 may be implemented through the antenna 1, the antenna 2, the mobile communication module 150, the wireless communication module 160, the modem processor, the baseband processor, and the like. The antenna 1 and the antenna 2 are configured to transmit and receive an electromagnetic wave signal.

The mobile communication module 150 may provide a wireless communication solution that is used in the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is used in the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs demodulation and filtering processing on an electromagnetic wave signal, and sends the processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display an image, a video, and the like. The camera 193 is configured to capture a static image or a video. The internal memory 121 may include one or more random access memories (random access memory, RAM) and one or more nonvolatile memories (nonvolatile memory, NVM). The external memory interface 120 may be configured to be connected to an external nonvolatile memory, to expand a storage capacity of the electronic device 100.

The electronic device 100 may implement an audio function, for example, music playing or sound recording, by using the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The speaker 170A, also referred to as a "horn", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal. The headset jack 170D is configured to be connected to a wired headset.

The pressure sensor 180A is configured to sense a pressure signal, and may convert the pressure signal into an electrical signal. The gyro sensor 180B may be configured to determine a moving posture of the electronic device 100. The barometric pressure sensor 180C is configured to measure barometric pressure. The magnetic sensor 180D includes a Hall sensor. The acceleration sensor 180E may detect acceleration values in various directions (usually on three axes) of the electronic device 100. The distance sensor 180F is configured to measure a distance. The optical proximity sensor 180G may include, for example, a light-emitting diode (LED) and an optical detector, for example, a photodiode. The light-emitting diode may be an infrared emitting diode. The electronic device 100 emits infrared light by using the light-emitting diode. The electronic device 100 detects infrared reflected light from a nearby object by using the photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch device". The bone conduction sensor 180M may obtain a vibration signal.

The button 190 includes a power button, a volume button, and the like. The button 190 may be a mechanical button, or may be a touch button. The motor 191 may generate a vibration prompt. The indicator 192 may be an indicator, and may be configured to indicate a charging status and a power change, or may be configured to indicate a message, a missed call, a notification, and the like. The SIM card interface 195 is configured to be connected to a SIM card.

In this embodiment of this application, when the electronic device 100 is a central node device, the mobile communication module 150 or the wireless communication module 160 may be configured to: receive a wake-up cycle of a subnode device, and send an optimal wake-up cycle and a reference time point to the subnode device.

The processor no may be configured to: calculate the optimal wake-up cycle based on one or more wake-up cycles, calculate an optimal wake-up time point based on the optimal wake-up cycle and the reference time point, determine whether to adjust a wake-up time point, and perform a wake-up based on an adjusted wake-up time point or an unadjusted wake-up time point. For specific related descriptions of a relationship between the wake-up cycle and the optimal wake-up cycle, a calculation principle of the optimal wake-up time point, and a principle of adjusting the wake-up time point, refer to the foregoing content. Details are not described herein again.

The internal memory 121 is configured to store a related instruction for calculating the wake-up time point and the one or more wake-up cycles.

In this embodiment of this application, when the electronic device 100 is a subnode device, the mobile communication module 150 or the wireless communication module 160 may be configured to: send a wake-up cycle to a central node device, and receive an optimal wake-up cycle and a reference time point that are sent by the central node device.

The processor 110 may be configured to: calculate an optimal wake-up time point based on the optimal wake-up cycle and the reference time point, determine whether to adjust a wake-up time point, and perform a wake-up based on an adjusted wake-up time point or an unadjusted wake-up time point. For specific related descriptions of a calculation principle of the optimal wake-up time point and a principle of adjusting the wake-up time point, refer to the foregoing content. Details are not described herein again.

Implementations of this application may be randomly combined, to achieve different technical effects.

All or some of embodiments may be implemented by using software, hardware, firmware, or any combination thereof. When software is used to implement embodiments, all or some of embodiments may be implemented in a form of a computer program product. The computer program product includes one or more computer program instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some procedures of the methods in embodiments may be implemented by a computer program instructing related hardware. The program may be stored in the computer-readable storage medium. When the program is executed, the procedures in the method embodiments may be performed. The storage medium includes any medium that can store program code such as a ROM, a random access memory RAM, a magnetic disk, or a compact disc.

In conclusion, the foregoing descriptions are merely example embodiments of the technical solutions of the present invention, and are not intended to limit the protection scope of the present invention. Any modification, equivalent replacement, improvement, or the like made in accordance with the disclosure of the present invention shall be included in the protection scope of the present invention.

What is claimed is:

1. A method applied to a first subnode device, the method comprising:

sending a first cycle to a central node device, wherein the first cycle is a wake-up cycle of the first subnode device;

receiving a second cycle and a reference time point, wherein the second cycle is determined by the central node device based on the first cycle; and adjusting a first original wake-up time point of the first subnode device to a first wake-up time point based on the second cycle and the reference time point, wherein a difference between the first original wake-up time point and the first wake-up time point is not greater than a threshold, the first wake-up time point is a sum of the reference time point and N times of the second cycle, and N is an integer greater than or equal to 0, wherein the threshold is ½ of the second cycle.

2. The method according to claim 1, wherein adjusting the first original wake-up time point of the first subnode device to the first wake-up time point comprises:

communicating with a second subnode device or the central node device at the first wake-up time point.

3. The method according to claim 2, further comprising, before communicating with the second subnode device at the first wake-up time point:

powering on a CPU at the first wake-up time point.

4. The method according to claim 1, wherein a wake-up of the first subnode device is a heartbeat wake-up or a non-real-time service wake-up.

5. The method according to claim 1, wherein the second cycle is a maximum value, a minimum value, an average value, or a common multiple of the first cycle and a wake-up cycle of the central node device.

6. The method according to claim 1, further comprising, after adjusting the first original wake-up time point of the first subnode device to the first wake-up time point based on the second cycle and the reference time point:

receiving a fourth cycle, wherein the fourth cycle is determined by the central node device based on the first cycle and a third cycle of a third subnode device, and the third cycle is a wake-up cycle of the third subnode device; and readjusting the wake-up time point of the first subnode device based on the fourth cycle.

7. The method according to claim 1, wherein the reference time point is a power-on time point, a randomly generated time point, or a preset time point of the central node device.

8. The method according to claim 1, wherein an adjusted wake-up cycle of the first subnode device is M times the second cycle, and M is a positive integer.

9. The method according to claim 1, further comprising:

maintaining, by the first subnode device, an original wake-up time point of a real-time service wake-up without adjustment based on the second cycle and the reference time point.

10. A method applied to a central node device, the method comprising:

receiving a first cycle of a first subnode device, wherein the first cycle is a wake-up cycle of the first subnode device;

determining a second cycle based on the first cycle;

sending the second cycle and a reference time point to the first subnode device;

receiving a third cycle of a third subnode device, wherein the third cycle is a wake-up cycle of the third subnode device;

determining a fourth cycle based on the third cycle and the first cycle; and sending the fourth cycle to the first subnode device and the third subnode device, wherein the first subnode device is configured to readjust a wake-up time point based on the second cycle and the reference time point to a wake-up time point based on the fourth cycle.

11. The method according to claim 10, wherein a wake-up of the first subnode device is a heartbeat wake-up or a non-real-time service wake-up.

12. The method according to claim 10, wherein the second cycle is a maximum value, a minimum value, an average value, or a common multiple of the first cycle and a wake-up cycle of the central node device.

13. The method according to claim 10, further comprising, before the sending the second cycle and the reference time point of the central node device to the first subnode device:

selecting, as the reference time point from a wake-up time point of the central node device, a wake-up time point closest to a current time point.

14. A method, comprising:

sending, by a first subnode device, a first cycle to a central node device, wherein the first cycle is a wake-up cycle of the first subnode device;

receiving, by the central node device, the first cycle of the first subnode device;

determining, by the central node device, a second cycle based on the first cycle;

sending, by the central node device, the second cycle and a reference time point of the central node device to the first subnode device; and adjusting, by the first subnode device, a first original wake-up time point of the first subnode device to a first wake-up time point based on the second cycle and the reference time point, wherein a difference between the first original wake-up time point and the first wake-up time point is not greater than a threshold, the first wake-up time point is a sum of the reference time point and N times of the second cycle, and N is an integer greater than or equal to 0, wherein the threshold is ½ of the second cycle.

15. The method according to claim 14, wherein adjusting, by the first subnode device, the first original wake-up time point of the first subnode device to the first wake-up time point comprises:

communicating, by the first subnode device, with a second subnode device or the central node device at the first wake-up time point.

16. The method according to claim 15, further comprising, before communicating, by the first subnode device, with the second subnode device at the first wake-up time point:

powering on, by the first subnode device, a CPU at the first wake-up time point.

17. The method according to claim 14, wherein a wake-up of the first subnode device is a heartbeat wake-up or a non-real-time service wake-up.

18. The method according to claim 14, wherein the second cycle is a maximum value, a minimum value, an average value, or a common multiple of the first cycle and a wake-up cycle of the central node device.

19. The method according to claim 14, further comprising:

after adjusting, by the first subnode device, the first original wake-up time point of the first subnode device to the first wake-up time point based on the second cycle and the reference time point:

receiving, by the central node device, a third cycle of a third subnode device, wherein the third cycle is a wake-up cycle of the third subnode device;

determining, by the central node device, a fourth cycle based on the third cycle and the first cycle;

sending, by the central node device, the fourth cycle to the first subnode device and the third subnode device; and readjusting, by the first subnode device, the wake-up time point of the first subnode device based on the fourth cycle, and readjusting, by the third subnode device, a wake-up time point of the third subnode device based on the fourth cycle.

20. The method according to claim 14, further comprising, before sending, by the central node device, the second cycle and the reference time point of the central node device to the first subnode device:

selecting, by the central node device as the reference time point from a wake-up time point of the central node device, a wake-up time point closest to a current time point.

* * * * *